Feb. 8, 1966  P. W. TILLISCH ETAL  3,233,301
APPARATUS FOR SURFACE TREATMENT OF WALLBOARD
Original Filed July 15, 1959  3 Sheets-Sheet 1

INVENTORS:
PAUL W. TILLISCH
ALBERT F. RAFFAELLI
BY
ATTORNEY

Feb. 8, 1966 P. W. TILLISCH ETAL 3,233,301
APPARATUS FOR SURFACE TREATMENT OF WALLBOARD
Original Filed July 15, 1959 3 Sheets-Sheet 2
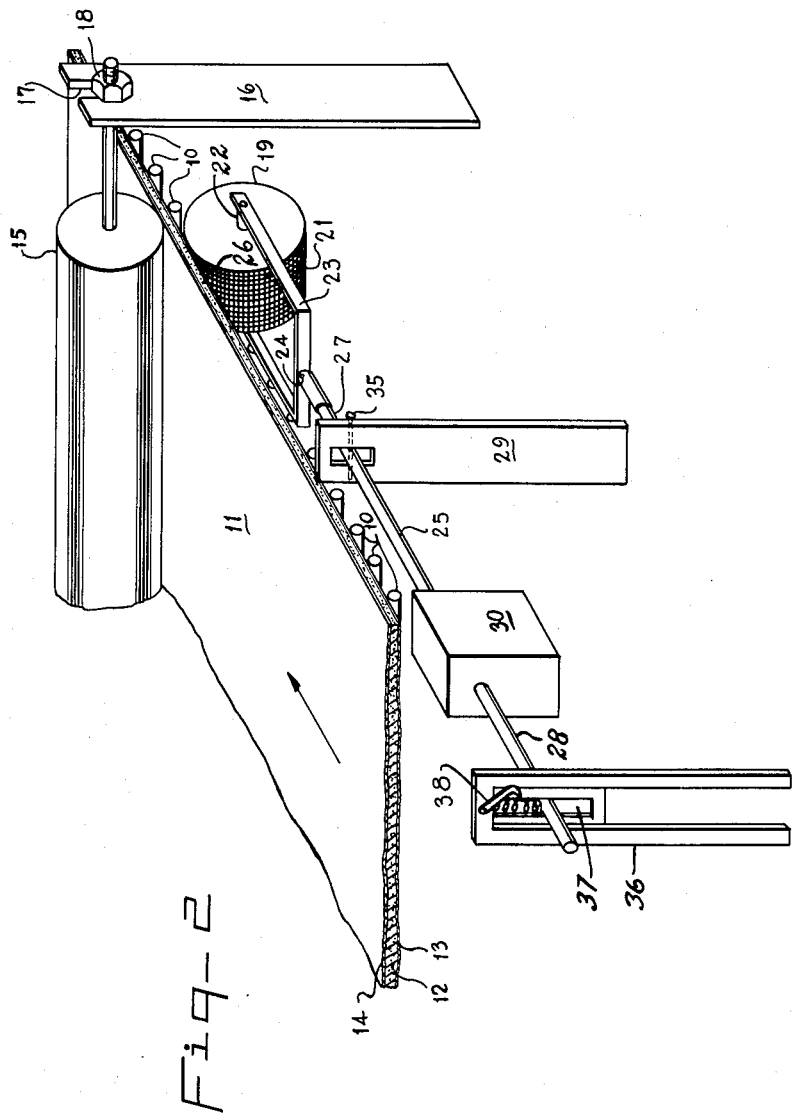
INVENTOR.
PAUL W. TILLISCH
ALBERT F. RAFFAELI
BY
ATTORNEY

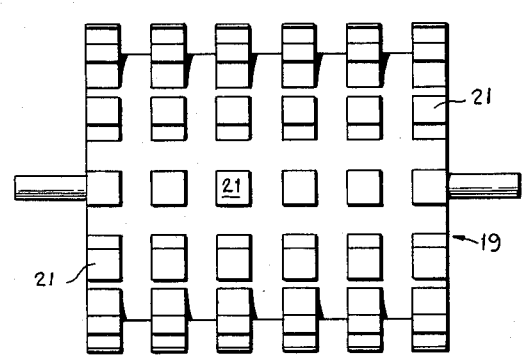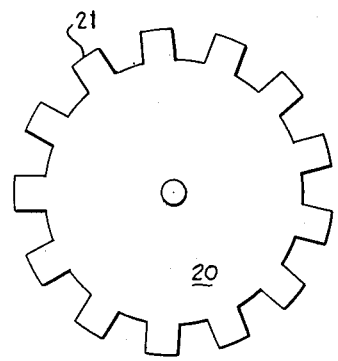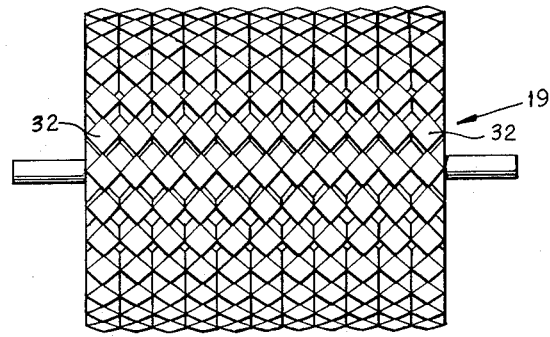

United States Patent Office 3,233,301
Patented Feb. 8, 1966

3,233,301
APPARATUS FOR SURFACE TREATMENT
OF WALLBOARD
Paul W. Tillisch, Antioch, and Albert F. Raffaelli, Concord, Calif., assignors to Kaiser Gypsum Company, Inc., Oakland, Calif., a corporation of Washington
Original application July 15, 1959, Ser. No. 827,367, now Patent No. 3,180,058, dated Apr. 27, 1965. Divided and this application June 27, 1963, Ser. No. 297,476
1 Claim. (Cl. 25—21)

This application is a division of application Serial No. 827,367, filed July 15, 1959, for Production of Gypsum Products, isued as U.S. Patent No. 3,180,058 dated April 27, 1965.

This invention relates to apparatus for indenting paper-covered plasterboard surface.

Plasterboard as used in building or construction operations is, as is well known, composed of a core consisting essentially of set gypsum crystals with minor amounts of modifying additives, and fibrous or paper covers or "liners" within which such core is deposited and set. In the installation of such boards, which will be understood to include also lath, the boards are placed so that the edges of two boards abut and the board surfaces are in coplanar relationship. In order to form a smooth abutting joint, an adhesive compound or joint cement is filled in at the joints and a fibrous or paper tape is laid over and adheres to such adhesive or cement and overlies a portion of the board adjacent the abutting edge. After this joint structure is set and hardened, finishing compound or plaster is applied over the boards and joint to provide a finished surface. The joint cement or adhesive prevents the appearance or occurrence of unsightly cracks and fissures at the joints after the work is finished and hardened, and assist in maintaining a pleasing surface appearance.

In one method of installation of such boards and the formation of such joints, the operator applies cementitious or adhesive material at the joints, applies tape over the cement, wipes off the excess cement and spreads the material evenly over the joint area by means of a broad knife, and in doing so, often removes too much of the adhesive material, or completely removes it from some portions of the joint zone, so that the tape fails to adhere, air bubbles or blisters form under the tape and the resulting joint is defective and unsightly. In methods where the joint cement is applied by means of a gun, or is pumped onto the joint as a stream of slurry, a rather thin slurry must be fed and the "mud" thereby deposited at the joint may provide insufficient adhesive material, or in other words, may be too lean, and again, joint failures frequently occur from this cause.

It is an object of this invention to provide a device for indenting the surface edge zones of plasterboard. It is a further particular object to provide a device for indenting the surface of a tapered edge of a plasterboard having paper liners. Other objects and advantages of this invention will become apparent from the description below.

The annexed drawings will more completely illustrate and explain the present invention and the various features thereof. In the drawings:

FIGURE 2 is a perspective view of one side of a board-making apparatus showing the indenting step of the operation in particular;

FIGURE 3 is a top view of an element of the indenting device according to the present invention;

FIGURE 4 is a top view of another embodiment of the indenting device;

FIGURE 5 is a side view of the device of FIGURE 3.

Figure 1:
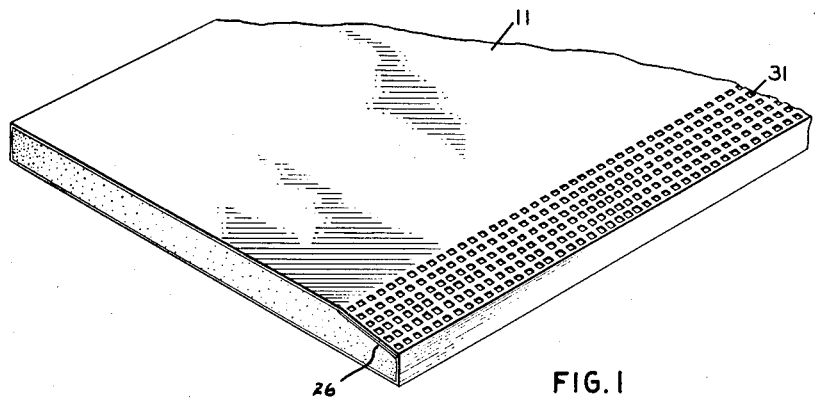
FIGURE 1 is a perspective view of a portion of a plasterboard made according to the invention, showing location of indentations.

According to the present invention there is provided a plasterboard having a plurality of shallow, discontinuous indentations in multiple rows in at least one surface adjacent the edge thereof, and adapted to retain joint cement applied to such surface to insure a joint which is satisfactory and of pleasing appearance. The indentations or depressions are shallow and do not deleteriously affect the strength of the board edge, and suitably are from 0.003 to 0.012 inch, and preferably from 0.005 to 0.008 inch, in depth. The depressions are of any desired configuration, e.g. of square, round or diamond-shaped cross-section, and the bottom or base of such depression can also be of any desired configuration, for example, flat, rounded or other. It is suitable that the depressed areas amount to from 15% to 80% of the total area of the zone to be cemented; and that preferably from 20% to 40% of such area be depressed. The indentations may vary in depth from one to another, i.e. as among themselves. That is to say, every depression need not be of the same depth as every other depression.

The indentations are disposed in a zone of the plasterboard surface at the edge thereof and preferably extending from the edge of the board inwardly to cover at least and preferably slightly more than the area which will eventually underlie the tape to be applied when the board is installed. For example, in the usual installation, it is preferred that the indentations be disposed in a longitudinal zone extending inwardly about 1.5 inches from the edge of the board, so that in applying a tape of about 2 to 2⅛ inches width, presence of joint cement at and beyond the edge of the tape insures adhesion over the whole width of such tape, and a tight joint of pleasing appearance, after application of the finishing compound. The indentations are disposed at one or more edges of the board, as desired.

The indentations are applied to any desired gypsum core board, suitably board having paper covers or liners, such as wallboard, lath, light weight wallboard, fire-resistant wallboard of heavier unit weights, or other. In many instances, such boards are provided with tapered edges to form the joints because such tapers have been deemed to receive and retain joint cement and tape and provide a uniform surface. However, it has been found in practice that wiping with a broadknife still removes excessive amounts of joint cement from the small valleys provided by such taper. Such removal is especially excessive at the outer edge of the taper where it meets the plane surface of the board and results in blisters or in failure to bond the edge of the later-applied tape, so that the tape is liable to tear when finishing compound is applied and an unsatisfactory joint results. It will be understood, of course, that the taper is necessarily slight in order to maintain strength of the board edges. According to this invention, a plurality of shallow, discontinuous depressions or indentations are provided in or at the tapered surfaces and insure retention in such surface of the required joint cement. The indentations are provided likewise in multiple rows to provide for a sufficient number of depressions to effect a satisfactory cementing action, as disclosed above.

A device for effecting the indentations according to the present invention comprises an embossed means for indenting, a pressure means to enable impressing the embossed means on the board surface, and preferably means for rotating the embossed means at an angle to the horizontal, along its axis, to conform to the taper where a tapered edge board is to be indented.

One suitable device for carrying out this invention is shown in FIGURES 2 and 3. FIGURE 2 shows a horizontal board line having a series of rollers 10 to support board 11 which is composed of core 12 consisting essentially of a mass of set gypsum crystals with any desired additives, facing paper liner 13 and backing paper liner 14. The board has come from the board-forming station which is well known in this art and will not be further described herein, and the board core has acquired its initial set. The board now passes beneath superposed hold-down means, e.g., roller 15 which is a steel cylinder of any desired diameter, extending across board 11 and of sufficient weight to hold the board against the indenting pressure to be applied. Roller 15 is supported at each end on a suitable standard 16 provided with a notch 17 at the top to support roller 15, the roller being vertically adjustable, to accommodate different board thicknesses, by means of lock nut 18.

Disposed beneath the board line and adjacent the outer edge of the lower surface of board 11 is embossed roller 19 which is a steel cylinder having bosses 21 disposed over its periphery. In the embodiment shown in FIGURES 3 and 5, bosses 21 are square in shape, arranged in a plurality of rectilinear vertical and horizontal rows, and occupying about 25% of the total surface area of roller 19. In the embodiment shown the bosses are about 1/8 inch in depth, but this is variable except that the bosses are at least slightly more than the depth of indentation desired. Thus, the height, or depth, of the embossing protuberance or lug is easily determined for any given indenting operation.

Roller 19 is supported at both ends, as shown at 22 in FIGURE 2, by a forked or bifurcate support means 23. At the central portion of the base of bifurcate support, or yoke, 23 lever arm 25 is rotatably connected by means of a ball-and-socket joint, indicated at 24. Yoke 23 thus rotates freely on arm 25, and therefore roller 19 is brought into uniform contact over its width with varying tapers of wallboard edge surface 26. Disposed between the two ends 27 and 28 of lever arm 25 is pivot support means 29 which acts as a fulcrum in the operation of the indenting device and method, as will be later explained. Lever arm 25 is fixed against forward travel by pin 35 in fulcrum 29, in this embodiment. End 28 of lever arm 25, beyond weight 30 passes through slot 37 of guide means 36, which acts to prevent roller 19 from swinging out of line during forward motion of the board. When it is desired to release roller 19 from contact with the board surface, latch 38 catches and holds end 28 of arm 25, lowering roller 19 out of operative position.

In the mode of operating the device and the embodiment thereof shown in FIGURE 2, a weight 30 is applied at end 28 of arm 25, and this acting through fulcrum 29 forces roller 19 upwardly against the lower edge surface 26 of board 11. As board 11 moves forward (shown by the arrow) on support rollers 10, embossed roller 19 rotates freely at 22, and pressing against the lower surface of the board forms therein a multiplicity of indentations, as shown in the board of FIGURE 1, for example, at 31, disposed in a plurality of longitudinal and transverse rows with respect to the board edge. It has been found that a pressure of from 150 to 300 lbs. per square inch applied at close to the initial setting time of the core provides suitable indentations. Increasing pressures, up to about 450 lbs. per square inch, for example, are applied when indentations are formed in the board at times approaching the final setting time; and pressures of 600 to 800 p.s.i. are useful if indenting after final set. For instance, if the roller 19 in FIGURE 2 is so disposed in the board line that when pressed against the board it indents just after the core has taken its initial set, it has been found that a satisfactory result is achieved with a pressure of about 200 lbs. per square inch. On the other hand, if the roller 19 is disposed farther from the forming station along the board line and at a point where the core is about to take its final set, it has been found that a pressure of about 400 lbs. per square inch gives a satisfactory result.

The embossed roller 19 forms in the board surface indentations as shown at 31 in FIGURE 1. If the edge is tapered or bevelled, the roller 19 is rotatably inclined as at 24, to conform to such taper or bevel. These can be arranged in rectilinear rows or at random, but there is a plurality of indentations over the width and longitudinally of the edge to be taped.

As an example of the method of carrying out this invention a lightweight wallboard is formed by depositing between paper liners a plastic slurry in water of an admixture of calcined gypsum, expanded vesiculated perlite, sawdust, starch and a retarder, as described in Riddell and Kirk, U.S. Patent 2,803,575, issued August 30, 1957. The core and liners are passed between forming rolls and then forwarded along the board line on a supporting belt until the core has taken its initial set, as will be shown for example by testing with the Vicat apparatus to see whether it still exhibits plastic flow, after which the board moves forward on rollers 10. The indenting roller 19 is placed in the line just beyond the stage where the board has taken its initial set, and a weight 30 is placed at end 28 of lever arm 25 to apply a pressure of about 200 lbs. per sq. in. at the contact between roller 19 and board face edge 26. In this example, the indenting roller has square protuberances, each about 1/8-inch on a side and about 1/8-inch deep, the protuberances or teeth occupying about 23% of the area of the roller surface. The roller indents the board face from the edge inwardly about 1.5 inches, applying six rows of indentations, each indentation being about 0.005 to 0.008 inch in depth. The board moves forward along the line until the core takes its final set, and thence to the drying zone where it is dried at a temperature of from about 210 degrees F. to about 400 degrees F., the temperature preferably not exceeding about 350 degrees F. At the end of the drying cycle the board is removed from the drying zone and cut into the desired lengths, weighing about 1900 lbs./ 1000 sq. ft. The board edges exhibit the desired permanent indentations which have not been effected by the completion of hardening and the drying steps. The boards are installed to form the interior walls of a building, using a commercial joint cement and wallboard tape, with formation of excellent joints, firm adhesion of the tape to the joint areas and freedom from tears or non-adhered portions.

It is an advantage of the invention that the device provided for forming the depressions is of simple, inexpensive construction and can be readily installed in the usual commercial board-forming arrangement without disruption of the usual operation thereof.

An alternative design for a roller, having diamond-shaped protuberances 32, is shown in FIG. 4. In forming the indentations, the paper liners are not broken but merely exhibit depressions therein. Where the term "edge surface" or "edge of surface" is employed herein, it is to be understood to mean the zone along the edge at a face of the board in question rather than the narrow transverse or sectional edge across the depth or thickness of the board, the latter being the 3/8-inch 1/2-inch or like dimension. The surface in question, in other words, is that parallel to the tape which is later applied. It is preferred that the surface area of the joint zone of the board exhibit no extensive plane surface without indentations closely adjacent the edge.

It is to be understood that the above specific description and example are given for purposes of illustration only and that variations and modifications can be made therein without departing from the spirit and scope of the appended claim.

Having now described the invention, what is claimed is:

In an apparatus for indenting a paper-covered plaster board surface including continuous means for horizontally supporting and forwarding said board, a rotatable generally horizontal cylindrical indenting means disposed beneath and in transverse contact with an edge surface of said board and adjacent and horizontally spaced from one side of said supporting and forwarding means, a plurality of spaced protuberances disposed over from 15% to 80% of the surface of said cylindrical means, a bifurcate yok supporting said cylindrical means, said yoke being freely rotatably supported by a generally horizontal lever arm, said lever arm being pivotally supported and bearing a weight to force said indenting means against said surface of said board, guide means to maintain said indenting means in line during forward motion of said board, and, a hold-down roller superposed above said board and said indenting means.

References Cited by the Examiner

UNITED STATES PATENTS

| | | |
|---|---|---|
| 269,480 | 12/1882 | Stuart. |
| 1,856,932 | 5/1932 | Shaw _____ 156—347 |
| 1,856,936 | 5/1932 | Turner _____ 156—347 |
| 2,702,917 | 3/1955 | Lynden _____ 15—230.11 |
| 3,057,395 | 10/1962 | Buttress _____ 156—347 |
| 3,058,868 | 10/1962 | Schroeder _____ 156—258 |
| 3,115,659 | 12/1963 | Church _____ 15—230.11 |

J. SPENCER OVERHOLSER, *Primary Examiner.*

ROBERT F. WHITE, WILLIAM J. STEPHENSON,
*Examiners.*

G. A. KAP, *Assistant Examiner.*